Dec. 1, 1959 N. FREEDMAN 2,915,601

PHASE DISTORTION CONTROLS

Filed May 24, 1955

INVENTOR
NATHAN FREEDMAN
BY Elmer J. Gorn
ATTORNEY

United States Patent Office
2,915,601
Patented Dec. 1, 1959

2,915,601

PHASE DISTORTION CONTROLS

Nathan Freedman, Auburndale, Mass., assignor to Raytheon Company, Waltham, Mass., a corporation of Delaware Application May 24, 1955, Serial No. 510,773
6 Claims. (Cl. 179—171)

This invention relates to reception of radiant energy, and particularly to microwave systems employing frequency modulation of the received energy to control the reception of television signals radiated from an FM transmitter, which signals include a color component in the form of a subcarrier signal mixed with the normal video signal.

The invention provides means to compensate for phase and amplitude distorting tendencies inherent in color subcarrier signal transmission. Thus, for example, when the invention is applied to double-tuned I.-F. amplifier stages of the receiver section of a TV relay system linking a point of program origin with a broadcast studio, the novel phase compensating means, here disclosed, operates to maintain constancy of signal amplitude, as well as phase fidelity, throughout the period of signal reception, and at all frequency positions across the range of the I.-F. band to which the system has been tuned. To achieve this result, the invention utilizes an all-band pass bridge circuit control which selectively directs the required proportion of the signal energy into each of two parallel circuit branches, and thereby reestablishes phase fidelity, in accordance with the instantaneously predominating positional pattern established by the frequency characteristics of the incoming signal energy, in relation to the center frequency of the selected I.-F. band.

More specifically, the bridge circuit control includes a half wavelength of coaxial transmission line connected to the input arms of the bridge circuit, a frequency-responsive impedance unit in one of said input arms, and in the other of said input arms an adjustable resistance unit adapted to complement the frequency-responsive impedance unit of the opposite branch of the bridge, so that first one and then the other branch may predominate as the major signal conducting vehicle at any given point in the cycle of operation, and so that the phase of each component of the total signal energy will be reversed, or not reversed, depending upon the frequency pattern prevailing at any particular instant.

The arrangement and mode of operation above outlined, and more fully described hereinafter, function to maintain network gain at unity value under all conditions of frequency variation. This constancy of network gain in turn assures constancy of signal amplitude, hence constancy of color saturation (color purity). Concurrently, the maintenance of phase fidelity insures consistency in the "hue" characteristics of the color signals.

These and other characteristics and advantages of the invention will be apparent upon reference to the following description of the embodiment of the invention illustrated in the accompanying drawing wherein.

Figure 1:
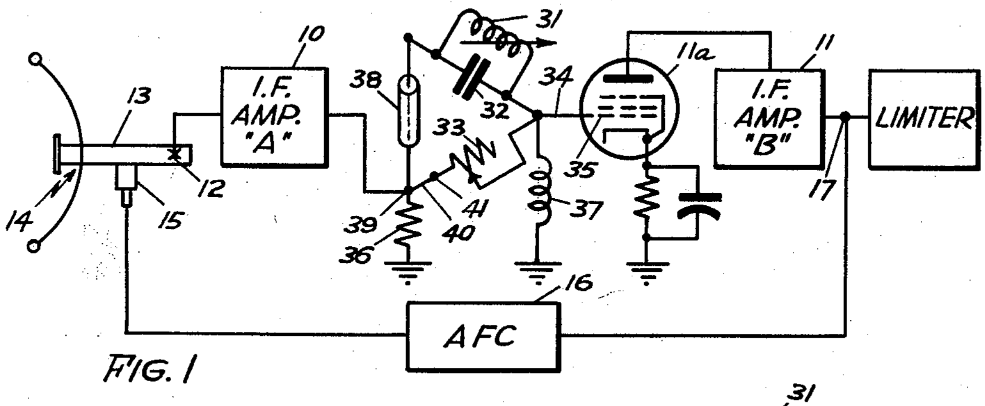
Fig. 1 is a schematic diagram of FM receiver circuitry embodying the invention.

As indicated in Fig. 1, the electronic components of the receiving half of a television relay link system may include I.-F. amplifier units 10 and 11 adapted to receive the I.-F. output of the crystal mixer 12 located near the inner end of receiver waveguide 13. Mixer 12 derives, from the high frequency carrier wave input received by antenna 14, the predetermined relatively narrow band of frequencies constituting the difference between the output frequency of local oscillator 15 (klystron or its equivalent) and the frequencies of the color signals entering the waveguide. These color signals may be in the form of a subcarrier wave of about 3.58 mc., normally mixed with the principal video signal, and therefore subject to both phase and amplitude distortion as video signal level changes, due to transconductance variations in individual components of the video amplifier stages of the system, or similar causes.

In I.-F. amplifiers 10 and 11, each individual amplifier stage (one of which is represented by pentode 11*a*, forming part of amplifier 11) is coupled to its adjacent stage by two resonant circuits. Such a "double-tuned" arrangement is necessary, as a practical matter, to achieve the desired gain without too great a reduction of the bandwidth factor. On the other hand, the use of double-tuning aggravates the tendency to distortion in that it increases the likelihood of nonlinearity in differential phase behavior.

Figure 4:
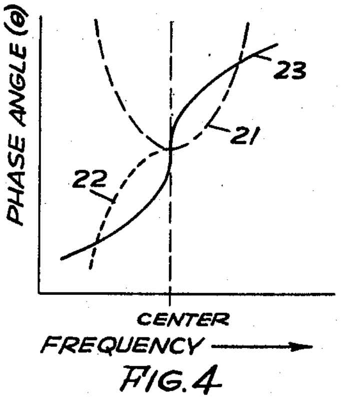
Fig. 4 is a phase angle-versus-frequency plot, based upon a mathematical analysis of Fig. 3.

The behavior curve of differential phase vs. frequency, for an I.-F. amplifier made up of double-tuned stages, is shown at 21 in Fig. 4. As there illustrated, the differential phase is roughly proportional to the slope of the phase shift curve 21. One-half of this curve 21 coincides with curve 22, representing phase angle ($\theta$) vs. frequency. To correct this relationship, that is, to make it linear, means must be provided to achieve the opposite phase curvature, as illustrated by curve 23 of Fig. 4. Ideally, this must be done in a way that will result in a reasonably flat amplitude response curve.

Fig. 1 illustrates circuitry adapted to produce the desired linearity, while maintaining the amplitude response substantially constant. Inductance 31 and capacitor 32, forming a frequency-responsive impedance unit, are arranged as one arm of a bridge whose parallel arm consists of variable resistor 33. The combined output of these units is delivered to control grid 35 of I.-F. amplifier stage 11*a* by way of conductor 34. A one-half wavelength coaxial line segment 38 is interposed between I.-F. amplifier output terminal 39 and impedance unit 31—32. A conductor 40 joins terminal 39 to terminal 41 of resistor 33, thus completing the bridge. Grounded resistor 36 acts as a line terminating, or loading factor, for the I.-F. stage 10, while inductance 37 serves to tune out the input capacitance of tube 11*a*, and thus assures proper impedance response. The operation is as follows:

As the frequency shifts from one side band through the center frequency, and across the opposite side band, the two mutually complementary bridge arms including elements 31, 32 and 33 function concurrently to maintain unity gain at all frequency values within the selected I.-F. band. That portion of the signal content passing through the upper bridge arm will depend upon how much of incoming energy is at frequencies to one side or the other of the center band frequency. Likewise, the percentage of the signal content undergoing phase reversal, in the half-wave line 38 at any given instant, will vary with the position within the I.-F. band occupied by the contemporary signal energy. That portion thereof which is of center-band frequency, for example, will be shunted completely to the lower arm of the bridge (through resistor 33) by reason of the infinite impedance presented by unit 31—32 to such center-band frequency.

Conversely, whenever any portion of the incoming energy is adjacent the upper or lower side-band limit frequencies, such portion will tend to follow the upper bridge arm to the exclusion of the higher resistance lower path, since unit 31—32 will offer practically no impedance whatever to such outer fringe frequencies. Intermediate frequencies, that is, those between the central and the fringe positions in the all-pass band, will divide between the two bridge arms in varying proportions, depending upon the varying impedance values which they encounter in the bridge circuit.

The result will be a corresponding division of the phasing operations between the phase-reversing upper arm of the bridge, and the non-phase-reversing lower arm, so that the over-all effect is to correct the phase relationships by the proper variable factor, from one instant to the next, as determined by the relative positioning of the incoming multiple frequency components of the signal wave train, all of which components will pass through the I.-F. band, and hence through the bridge, but with a continuously varying pattern of division as between the upper and lower bridge paths, and therefore, a continuously varying correction effect upon the phasing of the signals as they reach tube 11*a* of the second I.-F. amplifier stage 11.

Figure 2:
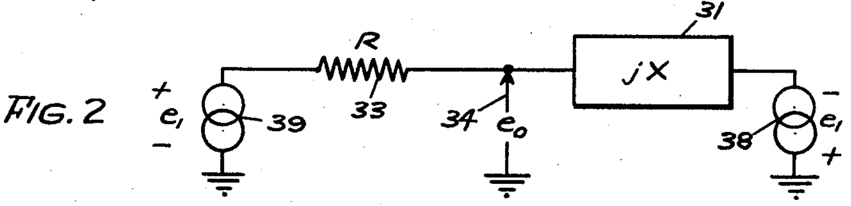
Fig. 2 is a diagram showing electrical equivalents for certain of the components of Fig. 1.
Figure 3:
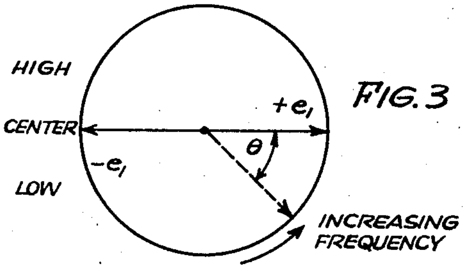
Fig. 3 is a vector diagram showing how the output voltage $e_0$ remains at constant amplitude throughout frequency changes while the phase angle swings through a full cycle.

In the equivalent circuit shown in Fig. 2 the following relationships obtain:

$$\frac{e_0}{e_1}=-\frac{(R-jX)}{(R+jX)}=\frac{-1}{-2\ \text{arctan}\ \frac{X}{R}}$$

This represents a gain of constant amplitude, with continuously varying phase. The instantaneous phase shift is equal to twice that represented by the ratio $X/R$.

Figure 5:
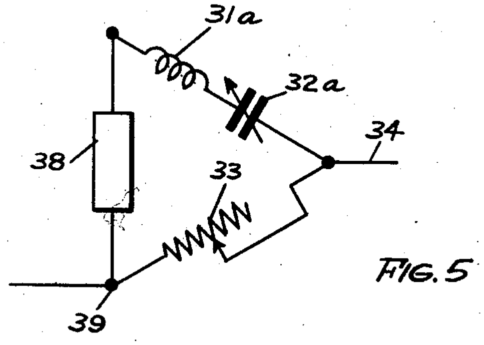
Fig. 5 shows a different arrangement of phase control means constituting a second embodiment.

In the example illustrated in Fig. 1, and above described, impedance unit 31—32 has been assumed to be of substantially zero impedance during side-band fringe frequency values, and of infinite impedance at the band center. Other impedance patterns may, of course, be substituted to meet varying non-linearity tendencies in particular installations. Thus, for example, in the arrangement suggested in Fig. 5, serially connected inductance and capacitance units 31*a* and 32*a* are substituted for the shunt-connected units 31 and 32 of Fig. 1. Such an arrangement will have impedance values that vary oppositely to the pattern of variation of Fig. 1, that is, the impedance will be zero at the center band frequency and will approach infinity at the upper and lower band limits. Whatever the arrangement, the proper phase correction will result if each bridge arm is properly adjusted to allow for phase reversal (by unit 38) of only that portion of the total band-passed energy which represents the net, or over-all, frequency shift pattern, and hence the degree of phase distortion requiring correction, at any given instant. Provisions for adjustment of each bridge unit are indicated, in both Fig. 1 and Fig. 5.

Frequency control for local oscillator 15 may take the form of a repeller voltage control network 16 deriving control voltage from a "before limiting" point 17 of the circuit in the manner disclosed in detail in copending application, Serial No. 421,733, filed April 8, 1954. Alternatively, any other known form of control may be substituted.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. In a system for receiving signal energy by passage through a multistage amplifier tuned to accept frequency-modulated components of said signal energy, the combination with said amplifier of a phase-compensating network interposed between successive stages thereof, said phase-compensating network comprising a first arm having means operative to introduce a substantially 180° shift in phase of the signal energy passing therethrough, said first arm also including a resonant circuit tuned to pass that portion of said signal energy undergoing phase reversal, and a second arm of substantially constant impedance.

2. In a system for receiving signal energy by passage through a multistage amplifier tuned to accept a band of frequency-modulated components of said signal energy, the combination with said amplifier of a phase-correcting network interposed between successive stages thereof, said phase-correcting network comprising a first arm having resonant circuit means operative to pass frequency components of said signal energy which are off the center frequency of said band after these components have undergone a substantially 180° phase shift, said first arm also including means operative to provide said off-center frequency components with said 180° phase shift, and a second arm having means adapted to pass signal energy therethrough without any substantial shift in phase.

3. In a system for receiving signal energy by passage through an I.-F. amplifier tuned to accept frequency-modulated components of said signal energy, the combination with said amplifier of a phase-correcting network in circuit therewith, said phase-correcting network comprising a first arm having means operative to provide a substantially 180° shift in phase of the signal energy passing therethrough, said first arm also including resonant circuit means tuned to pass that portion of said signal energy undergoing a phase reversal, and a second arm of substantially constant impedance connected in parallel with said first arm.

4. Apparatus as defined in claim 2, wherein said phase-shift means comprises a coaxial line of one-half the length of a single wave oscillating at the selected center frequency of said frequency-modulated signal components, said half-wave length of coaxial line being connected in one arm only of said network.

5. A phase-correction network for compensating for the tendency of F.M. signal energy to depart from phase regularity, said network comprising an input terminal, an output terminal, means connected to said input terminal for applying signal energy including frequency-modulated components to said input terminal, and an all-pass bridge circuit connected between said input and output terminals, said bridge circuit having a phase-inverting element and a resonant circuit in one of its two parallel arms, and a substantially constant impedance element in the other of said arms.

6. In combination, an input terminal, an output terminal, a source of frequency-modulated energy connected to said input terminal, a phase-compensating network connected between said input terminal and said output terminal, said phase-compensating network comprising a first arm having a phase-inverting element and a resonant circuit tuned to pass frequency-components inverted by said phase-inverting element, and a second arm having a substantially constant impedance element therein.

References Cited in the file of this patent

UNITED STATES PATENTS

| | | |
|---|---|---|
| 2,236,134 | Gloess | Mar. 25, 1941 |
| 2,280,282 | Colchester | Apr. 21, 1942 |
| 2,658,958 | Wells | Nov. 10, 1953 |
| 2,737,628 | Haines | Mar. 6, 1956 |

OTHER REFERENCES

Ser. No. 345,002, Nagai (A.P.C.), published May 18, 1943.